(12) United States Patent
Aggarwal et al.

(10) Patent No.: US 8,005,839 B2
(45) Date of Patent: Aug. 23, 2011

(54) METHOD AND APPARATUS FOR AGGREGATION IN UNCERTAIN DATA

(75) Inventors: Charu C. Aggarwal, Mohegan Lake, NY (US); Philip Shi-Lung Yu, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 12/039,076

(22) Filed: Feb. 28, 2008

(65) Prior Publication Data
US 2009/0222472 A1 Sep. 3, 2009

(51) Int. Cl.
*G06F 17/30* (2006.01)
(52) U.S. Cl. .................................. 707/737; 707/805
(58) Field of Classification Search .................. None
See application file for complete search history.

(56) References Cited

U.S. PATENT DOCUMENTS

| | | | |
|---|---|---|---|
| 7,467,165 B2 * | 12/2008 | Okada et al. | 707/999.202 |
| 2008/0071841 A1 * | 3/2008 | Okada et al. | 707/202 |
| 2009/0070390 A1 * | 3/2009 | Okada et al. | 707/202 |

OTHER PUBLICATIONS

Chent et al., "Efficient Indexing Methods for Probabilistic Threshold Queries over Uncertain Data," VLDB Conference, 2004, pp. 876-887.*
C.C. Aggarwal, "On Futuristic Query Processing in Data Streams," EDBT Conference Proceedings, 2006, 18 pages.
C.C. Aggarwal et al., "A Framework for Clustering Evolving Data Streams," Proceedings of the 29th VLDB Conference, 2003, 12 pages, Germany.
R. Agrawal et al., "Privacy-Preserving Data Mining," ACM SIGMOD Conference Proceedings, 2000, 12 pages.
R.T. Ng et al., "Efficient and Effective Clustering Methods for Spatial Data Mining," Proceedings of the 20th VLDB Conference, 1994, 12 pages, Chile.
T. Zhang et al., "Birch: An Efficient Data Clustering Method for Very Large Databases," SIGMOD, 1996, pp. 103-114, Canada.
C.C. Aggarwal, "On Density Based Transforms for Uncertain Data Mining," IEEE ICDE Conference, 2007, 10 pages.
D. Burdick et al., "OLAP Over Uncertain and Imprecise Data," VLDB Conference, 2005, pp. 970-981.
R. Cheng et al., "Efficient Indexing Methods for Probabilistic Threshold Queries Over Uncertain Data," VLDB Conference, 2004, pp. 876-887.
N. Dalvi et al., "Efficient Query Evaluation on Probabilistic Databases," VLDB Conference, 2004, pp. 864-875.
A. Das Sarma et al., "Working Models for Uncertain Data," IEEE ICDE Conference, 2006, 21 pages.
H.-P. Kriegel et al., "Density-Based Clustering of Uncertain Data," ACM KDD Conference, 2005, pp. 672-677.

(Continued)

*Primary Examiner* — Baoquoc To
(74) *Attorney, Agent, or Firm* — William Stock; Ryan, Mason & Lewis, LLP

(57) ABSTRACT

Techniques are disclosed for aggregation in uncertain data in data processing systems. For example, a method of aggregation in an application that involves an uncertain data set includes the following steps. The uncertain data set along with uncertainty information is obtained. One or more clusters of data points are constructed from the data set. Aggregate statistics of the one or more clusters and uncertainty information are stored. The data set may be data from a data stream. It is realized that the use of even modest uncertainty information during an application such as a data mining process is sufficient to greatly improve the quality of the underlying results.

17 Claims, 2 Drawing Sheets

OTHER PUBLICATIONS

L.V.S Lakshmanan et al., "ProbView: A Flexible Database System," ACM Transactions on Database Systems, 1997, pp. 419-469, vol. 22, No. 3.

S.I. McClean et al., "Aggregation of Imprecise and Uncertain Information," IEEE Transactions on Knowledge and Data Engineering, 2001, pp. 902-912, vol. 13, No. 6.

L. O'Callaghan et al., "Streaming-Data Algorithms for High-Quality Clustering," ICDE Conference Proceedings, 2002, pp. 1-10.

A.L.P. Chen et al., "Evaluating Aggregate Operations Over Imprecise Data," IEEE Transactions on Knowledge and Data Engineering, Apr. 1996, pp. 273-284, vol. 8, No. 2.

D. Barbara et al., "The Management of Probabilistic Data," IEEE Transactions on Knowledge and Data Engineering, Oct. 1992, pp. 487-502, vol. 4, No. 5.

S. Guha et al., "Cure: An Efficient Clustering Algorithm for Large Databases," ACM SIGMOD Conference, 1998, 12 pages.

M. Kumar et al., "Clustering Seasonality Patterns in the Presence of Errors," ACM KDD Conference Proceedings, 2002, pp. 557-563, Canada.

S.R. Jeffery et al., "Adaptive Cleaning for RFID Data Streams," VLDB Conference Proceedings, Sep. 2006, 12 pages.

W.K. Ngai et al., "Efficient Clustering of Uncertain Data,"ICDM Conference Proceedings, 2006, 10 pages.

* cited by examiner

METHOD AND APPARATUS FOR AGGREGATION IN UNCERTAIN DATA

This invention was made with Government support under Contract No. H98230-07-C-0383 awarded by the Department of Defense. The Government has certain rights in this invention.

FIELD OF THE INVENTION

The present invention relates to data processing systems and, more particularly, to techniques for aggregation in uncertain data in such data processing systems.

BACKGROUND OF THE INVENTION

In recent years, the problem of mining uncertain data sets has gained importance because of its numerous applications to a wide variety of problems, see, e.g., C. C. Aggarwal, "On Density Based Transforms for Uncertain Data Mining," in ICDE Conference Proceedings, 2007; R. Cheng, Y. Xia, S. Prabhakar, R. Shah and J. Vitter, "Efficient Indexing Methods for Probabilistic Threshold Queries over Uncertain Data," in VLDB Conference Proceedings, 2004; N. Dalvi and D. Suciu, "Efficient Query Evaluation on Probabilistic Databases," in VLDB Conference Proceedings, 2004; A. Das Sarma, O. Benjelloun, A. Halevy and J. Widom, "Working Models for Uncertain Data," ICDE Conference Proceedings, 2006; D. Burdick, P. Deshpande, T. Jayram, R. Ramakrishnan and S. Vaithyanathan, "OLAP Over Uncertain and Imprecise Data," VLDB Conference Proceedings, 2005; and H-P. Kriegel and M. Pfeifle, "Density-Based Clustering of Uncertain Data," ACM KDD Conference Proceedings, 2005, the disclosures of which are incorporated by reference herein.

This is because data collection methodologies are often inaccurate and are based on incomplete or inaccurate information. For example, sensor data sets are usually noisy and lead to a number of challenges in processing, cleaning and mining the data. Some techniques for adaptive cleaning of such data streams may be found in S. R. Jeffery, M. Garofalakis and M. J. Franklin, "Adaptive Cleaning for RFID Data Streams," VLDB Conference Proceedings, 2006, the disclosure of which is incorporated by reference herein. In many cases, estimations of the uncertainty in the data are available from the methodology used to measure or reconstruct the data. Such estimates may either be specified in the form of error variances (above-cited C. C. Aggarwal, "On Density Based Transforms for Uncertain Data Mining," in ICDE Conference Proceedings, 2007) or in the form of probability density functions (above-cited R. Cheng, Y. Xia, S. Prabhakar, R. Shah and J. Vitter, "Efficient Indexing Methods for Probabilistic Threshold Queries over Uncertain Data," in VLDB Conference Proceedings, 2004).

In general, a variety of online methods exist to estimate missing data values along with the corresponding errors. In such cases, this results in streams of uncertain data. Some examples in which the uncertainty of the data are available are as follows:

In cases such as sensor streams, the errors arise out of inaccuracies in the underlying data collection equipment. In many cases, the values may be missing and statistical methods (see, e.g., R. Little and D. Rubin, "Statistical Analysis with Missing Data Values," Wiley Series in Prob. and Stats. 1987, the disclosure of which is incorporated by reference herein) may need to be used to impute these values. In such cases, the error of imputation of the entries may be known a-priori.

In many temporal and stream applications, quick statistical forecasts of the data may be generated in order to perform the mining. In C. C. Aggarwal, "On Futuristic Query Processing in Data Streams," EDBT Conference Proceedings, 2006, the disclosure of which is incorporated by reference herein, a technique has been discussed to construct forecasted pseudo-data streams for mining and querying purposes. In such cases, the statistical uncertainty in the forecasts is available.

In privacy-preserving data mining, uncertainty may be added to the data in order to preserve the privacy of the results. For example, in some perturbation based methods (see, e.g., R. Agrawal and R. Srikant, "Privacy-Preserving Data Mining," ACM SIGMOD Conference Proceedings, 2000, the disclosure of which is incorporated by reference herein), the data points are perturbed with the use of a probability distribution. In such cases, the exact level of uncertainty in the data is available.

SUMMARY OF THE INVENTION

Principles of the invention provide techniques for aggregation in uncertain data in data processing systems.

In one embodiment, a method of aggregation in an application that involves an uncertain data set comprises the following steps. The uncertain data set along with uncertainty information is obtained. One or more clusters of data points are constructed from the data set. Aggregate statistics of the one or more clusters and uncertainty information are stored.

Further, the uncertainty information may comprise a variance of the data set. The uncertainty information may comprise a probability density function of the data set. The step of constructing the one or more clusters may use a partition-based approach. The step of constructing the one or more clusters may use expected distances. The expected distances may be computed with the use of first order and second order statistics. The aggregate statistics may be maintained along with each cluster. The aggregate statistics may be maintained in terms of first order and second order moments of underlying data values of the data set. Second order error information may be maintained in the aggregate statistics. The data set may comprise data from a data stream.

Advantageously, we propose using a very general model of the uncertainty in which we assume that only a few statistical measures of the uncertainty are available. It is realized that the use of even modest uncertainty information during an application such as a data mining process is sufficient to greatly improve the quality of the underlying results.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
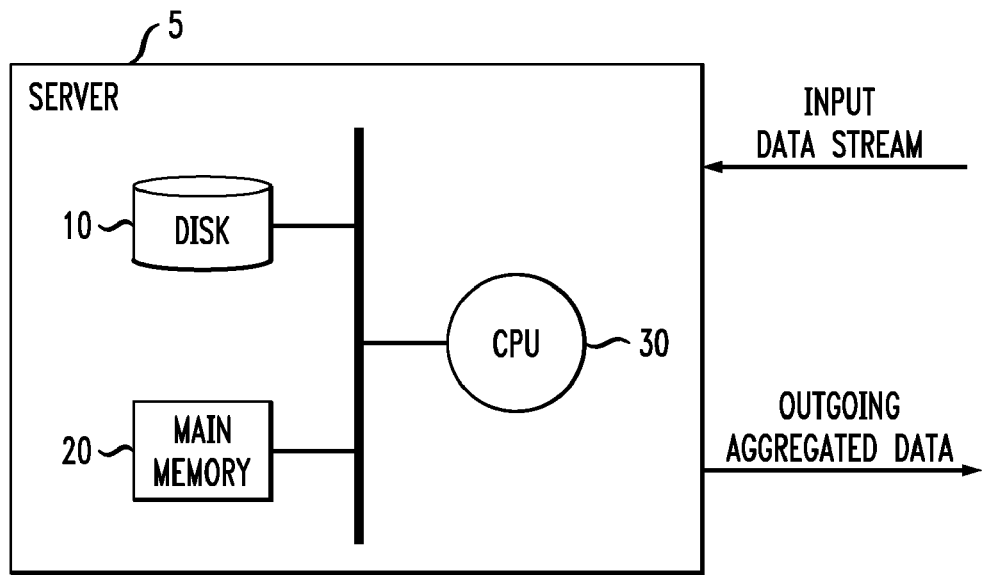
FIG. 1 shows a computing architecture according to an embodiment of the invention.

Principles of the invention can be used in a wide variety of data processing applications, including but not limited to, mining of records in sensor data applications, demographic data applications, and privacy-preserving data mining applications. By way of example only, in a sensor data application, records could be temperature or light readings from a sensor network along with the variance in the corresponding readings. This variance represents the inherent uncertainty in the sensor readings. A query to be processed might be a nearest neighbor query. For example, for a particular (temperature, intensity) combination, we may wish to determine the closest sensor reading.

Furthermore, principles of the invention realize that the results of data mining algorithms can often be sensitive to the errors in the underlying data. For example, an attribute with a large amount of error is less reliable for data mining purposes than one with smaller error. This can affect the quality of the underlying results for data mining applications, since different attributes and records may need to be treated differently for mining purposes.

As will be shown, principles of the invention will use a flexible model of uncertainty in which we only assume that the standard error of the underlying data point is known. This is less restrictive than models in which it is assumed that the entire probability distribution function of the data is known. In many real applications, only limited uncertainty information (such as the standard error) may be available. This is especially true of stream based applications in which online techniques are used in order to perform data estimation and collection. Furthermore, measures such as the standard error are much more compact from a representational point of view. This is important from the efficiency perspective in data stream applications.

In accordance with an illustrative embodiment of the invention, we will explore the uncertain clustering problem for the case of data streams. Data streams pose a special challenge because the data records can be processed at most once during the entire computation. Furthermore, the uncertainty information needs to be processed simultaneously with the attribute information. Uncertain data sets are also prevalent in stream applications, because typical data recording methods such as sensors often have noisy or incomplete recording mechanisms.

We will now discuss the clustering method for data streams. We will first introduce some additional notations and definitions. We assume that we have a data stream which contains d dimensions. The actual records in the data are denoted by $X_1, X_2, \ldots X_N$. ... We assume that the estimated error associated with the j-th dimension for data point $X_i$ is denoted by $psi_j(X_i)$. This error is defined in terms of the standard deviation of the error associated with the value of the j-th dimension of $X_i$. The corresponding d-dimensional error vector is denoted by $psi(X_i)$. Thus, the input to the algorithm is a data stream in which the i-th pair is denoted by $(X_i, psi(X_i))$.

Rather than assuming that the entire probability density function is available, we make the more modest assumption that the standard error of individual entries is available. In many real applications, this is a more realistic assumption for data mining purposes, since complete probability distributions are rarely available, and are usually inserted only as a modeling assumption. The interpretation of this error value can vary with the nature of the data mining application. For example, in a scientific application in which the measurements can vary from one observation to another, the error value is the standard deviation of the observations over a large number of measurements. In a k-anonymity based data (or incomplete data) mining application, this is the standard deviation of the partially specified (or imputed) fields in the data.

We will develop a method for clustering uncertain data streams with the use of a micro-clustering model. The micro-clustering model was first proposed in T. Zhang, R. Ramakrishnan and M. Livny, "BIRCH: An Efficient Data Clustering Method for Very Large Databases," ACM SIGMOD Conference Proceedings, 1996, the disclosure of which is incorporated by reference herein, for large data sets, and subsequently adapted in C. C. Aggarwal, J. Han, J. Wang and P. Yu, "A Framework for Clustering Evolving Data Streams," VLDB Conference Proceedings, 2003, the disclosure of which is incorporated by reference herein, for the case of deterministic data streams. We will see that the uncertainty in the underlying data significantly affects the quality of the clusters with methods that use such error information.

In order to incorporate the uncertainty into the clustering process, we provide a method to incorporate and leverage the error information into the micro-clustering statistics and algorithms. As discussed above, it is assumed that the data stream comprises a set of multi-dimensional records $X_1 \ldots X_k \ldots$ arriving at time stamps $T_1 \ldots T_k \ldots$. Each $X_i$ is a multi-dimensional record containing d dimensions which are denoted by $X_i = (x_i^1 \ldots x_i^d)$. In order to apply the micro-clustering method to the uncertain data mining problem, we define the concept of error-based micro-clusters. We define such micro-clusters as follows:

An uncertain micro-cluster for a set of d-dimensional points $X_{i_1} \ldots X_{i_n}$ with time stamps $T_{i_1} \ldots T_{i_n}$ and error vectors $psi(X_{i_1}) \ldots psi(X_{i_n})$ is defined as the (3d+2)tuple($CF2^x(C)$, $EF2^x(C)$, $CF1^x(C)$, t(C), n(C)), wherein $CF2^x(C)$, $EF2^x(C)$, and $CF1^x(C)$ each correspond to a vector of d entries. The entries in $EF2^x(C)$ correspond to the error-based entries. The definition of each of these entries is as follows:

For each dimension, the sum of the squares of the data values is maintained in $CF2^x(C)$. Thus, $CF2^x(C)$ contains d values. The p-th entry of $CF2^x(C)$ is equal to $sum_{j=1}^n (x_{i_j}^p)^2$. This corresponds to the second moment of the data values along the p-th dimension.

For each dimension, the sum of the squares of the errors in the data values is maintained in $EF2^x(C)$. Thus, $EF2^x(C)$ contains d values. The p-th entry of $EF2^x(C)$ is equal to $sum_{j=1}^n psi_p(X_{i_j})^2$. This corresponds to the sum of squares of the errors in the records along the p-th dimension.

For each dimension, the sum of the data values is maintained in $CF1^x(C)$. Thus, $CF1^x(C)$ contains d values. The p-th entry of $CF1^x(C)$ is equal to $sum_{j=1}^n x_{i_j}^p$. This corresponds to the first moment of the values along the p-th dimension.

The number of points in the data is maintained in n(C).

The time stamp of the last update to the micro-cluster is maintained in t(C).

We note that the uncertain definition of micro-clusters differs from the deterministic definition, since we have added an additional d values corresponding to the error information in the records. We will refer to the uncertain micro-cluster for a set of points C by ECF(C).

We note that the cluster statistics for the union of two clusters is the sum of the corresponding data points. The additive property follows from the fact that the statistics in the individual micro-clusters are expressed as a separable additive sum of the statistics over individual data points. We note that the single temporal component $t(C_1 \cup C_2)$ is given by max $t(C_1), t(C_2)$. We note that the additive property is an important one, since it ensures that it is easy to keep track of the cluster statistics as new data points arrive. Next we will discuss the process of uncertain micro-clustering.

The clustering algorithm works using an iterative approach which maintains a number of micro-cluster centroids around which the clusters are built. It is assumed that one of the inputs to the algorithm is $\eta_{micro}$, which is the number of micro-clusters to be constructed. The algorithm starts off with a number of null clusters and initially creates new singleton clusters, to which new points are added subsequently. For any incoming data point, the closest cluster centroid is determined. The closest cluster centroid is determined by using the expected distance of the uncertain data point to the uncertain micro-clusters. The process of expected distance computation for the closest centroid will be subsequently discussed.

Furthermore, for the incoming data point, it is determined whether it lies within a critical uncertainty boundary of the micro-cluster. If it lies within this critical uncertainty boundary, then the data point is added to the micro-cluster, otherwise a new micro-cluster needs to be created containing the singleton data point. In order to create a new micro-cluster, it is either added to the current set of micro-clusters, or it replaces one of the older micro-clusters. In the initial stages of the algorithm, the current number of micro-clusters is less than $\eta_{micro}$. If this is the case, then the new data point is added to the current set of micro-clusters as a separate micro-cluster with a singleton point in it. Otherwise, the new data point replaces one of the older micro-clusters. For this purpose, we replace the least recently updated micro-cluster from the data set. This information is available from the temporal time stamp in the different micro-clusters.

In order to compute the expected similarity of the data point X to the centroid of the cluster C, we determine a closed form expression which is expressed only in terms of X and ECF(C). We note that just as the individual data points are essential random variables with a given error, the centroid Z of a cluster C is also a random variable. This can be used in order to compute the expected similarity of the uncertain data point to the corresponding centroid.

Given the above summarization of techniques according to an embodiment of the invention, we now describe implementations of such techniques in the context of an illustrative system and methodologies.

FIG. 1 shows a computing architecture for use in implementing an embodiment of the invention. The overall computations are performed on server 5. The incoming data stream illustrated contains all the uncertainty information necessary in order to perform the clustering. The information is then aggregated into outgoing data. It is assumed that the uncertainty has already been aggregated into the input data stream. This can be done in a variety of ways. For example, in the case of sensor networks, the inherent uncertainty in the underlying sensor readings can be measured by prior experimentation.

The server contains a disk 10, main memory 20, and central processing unit (CPU) 30. The incoming data and the outgoing data can be stored on the disk. The main memory is used for caching, which can speed up the computations. The computations performed at the CPU.

Thus, it is to be understood that FIG. 1 illustrates a computer system in accordance with which one or more components/steps of the techniques of the invention may be implemented. It is to be further understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 1 may represent one or more servers or one or more other processing devices capable of providing all or portions of the functions described herein. Alternatively, FIG. 1 may represent a mainframe computer system.

The computer system may generally include a processor (CPU 30), memory (disk 10 and main memory 20), input/output (I/O) devices (not expressly shown), and network interface (not expressly shown), coupled via a computer bus or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard disk drive), a removable memory device (e.g., diskette), flash memory, etc. The memory may be considered a computer readable storage medium.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Figure 2:
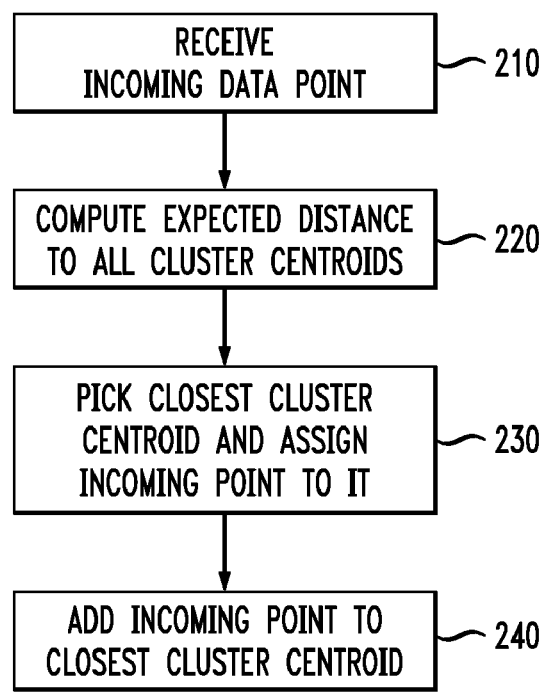
FIG. 2 shows a clustering according to an embodiment of the invention.

FIG. 2 illustrates an overall approach used for the clustering. The overall clustering algorithm uses a partitioning approach in which cluster centroids are maintained dynamically. Any incoming data point is added to one of these cluster centroids, and the corresponding centroid statistics are updated. The centroid statistics comprise the following components as discussed above:

Aggregate of second order value statistics.
Aggregate of first order value statistics.
Number of points in the cluster.
Aggregate of second-order error statistics.
Time stamp information about the cluster.

In step 210, the process receives the incoming data point. In step 220, the process computes the expected distance of the incoming data point to all the cluster centroids. We note that both the incoming data point and the cluster centroid are random variables and therefore the expected distances can be computed. In step 230, the process selects the closest cluster centroid based on this expected distance. In step 240, the process adds the incoming data point to the closest cluster centroid.

We note that the steps in FIG. 2 illustrate the approach only for a single data point in the stream. This step is repeated for each incoming point in the data stream.

Figure 3:
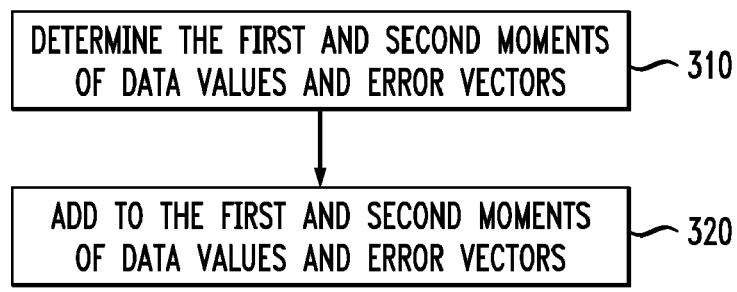
FIG. 3 shows a process of computing cluster centroids according to an embodiment of the invention.

FIG. 3 illustrates a process of computing a cluster centroid in response to the incoming data point, i.e., a process for modifying the centroid in the underlying data. This can be considered a detailed description of step 240 of FIG. 2. In step 310, the process determines the first and second moments of the data values and error vectors of the incoming data point. In step 320, the process adds to the feature vector of the cluster centroid in order to update it. This addition is performed in step 320.

Figure 4:
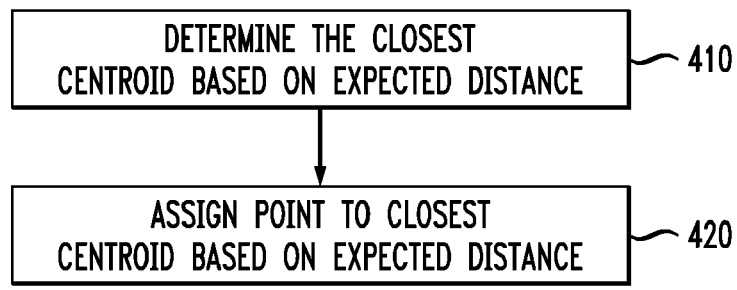
FIG. 4 shows a process of assignment of points to cluster centroids according to an embodiment of the invention.

FIG. 4 illustrates a process of assignment of the incoming data point to the closest cluster centroid. This can be considered a detailed description of step 230 of FIG. 2. In step 410, the process determines the closest centroid based on the expected distance. In step 420, the process assigns the incoming data point to the closest cluster centroid.

Figure 5:
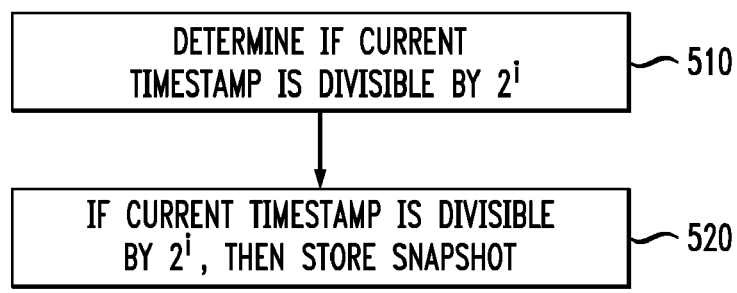
FIG. 5 shows a process of storing snapshots of clusters according to an embodiment of the invention.

FIG. 5 illustrates a process of storing snapshots of the data at specific time intervals. One option is to store the statistics of the clusters at each possible time stamp. This is however not an acceptable solution, since it can result in extremely high computational and storage costs. Therefore, we use a pyramidal pattern of storage. At each moment in time, the process stores only the last k snapshots which are divisible by $2^i$ for a particular value of i. Therefore, at any given tick of the clock, the process decides whether the current time stamp is divisible by $2^i$, in step 510. If the time stamp is indeed divisible by $2^i$, then the process stores the corresponding snapshot at that moment.

In accordance with embodiments of the invention, we presented a system and method for clustering uncertain data streams. Uncertain data streams are often likely to be present in many real applications because of inaccurate recording mechanisms. The uncertainty in the data stream significantly affects the clustering process, because of the varying relative behavior of the different attributes and its effect on the distance computations.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of aggregation in an application that involves an uncertain data set, comprising the steps of:
    obtaining as input the uncertain data set along with uncertainty information, wherein a probability distribution function for the uncertain data is unavailable and wherein the uncertainty information for each data point comprises a standard deviation error measure for the data point in the data set;
    constructing one or more clusters of data points from the data set, wherein constructing comprises adding a given data point to one of the clusters based on the uncertainty information associated with the given data point;
    updating statistics for the cluster to which the given data point is added based on the uncertainty information associated with the given data point; and
    storing aggregate statistics for each cluster of the one or more clusters.

2. The method of claim 1, wherein the step of constructing the one or more clusters uses a partition-based approach.

3. The method of claim 1, wherein the step of constructing the one or more clusters uses expected distances.

4. The method of claim 3, wherein the expected distances are computed with the use of first order and second order statistics.

5. The method of claim 1, wherein the aggregate statistics are maintained along with each cluster.

6. The method of claim 5, wherein the aggregate statistics are maintained in terms of first order and second order moments of underlying data values of the data set.

7. The method of claim 5, wherein second order error information is maintained in the aggregate statistics.

8. The method of claim 1, wherein the data set comprises data from a data stream.

9. An article of manufacture for aggregation in an application that involves an uncertain data set, comprising a computer readable storage medium including one or more programs which when executed by a computer perform the steps of:
    obtaining as input the uncertain data set along with uncertainty information, wherein a probability distribution function for the uncertain data is unavailable and wherein the uncertainty information for each data point comprises a standard deviation error measure for the data point in the data set;
    constructing one or more clusters of data points from the data set, wherein constructing comprises adding a given data point to one of the clusters based on the uncertainty information associated with the given data point;
    updating statistics for the cluster to which the given data point is added based on the uncertainty information associated with the given data point; and
    storing aggregate statistics for each cluster of the one or more clusters.

10. Apparatus for aggregation in an application that involves an uncertain data set, comprising:
    a memory; and
    at least one processor coupled to the memory and operative to:
        obtain as input the uncertain data set along with uncertainty information, wherein a probability distribution function for the uncertain data is unavailable and wherein the uncertainty information for each data point comprises a standard deviation error measure for the data point in the data set,
        construct one or more clusters of data points from the data set, wherein constructing comprises adding a given data point to one of the clusters based on the uncertainty information associated with the given data point,
        update statistics for the cluster to which the given data point is added based on the uncertainty information associated with the given data point, and
        store aggregate statistics of the one or more clusters and uncertainty information.

11. The apparatus of claim 10, wherein constructing the one or more clusters uses a partition-based approach.

12. The apparatus of claim 10, wherein constructing the one or more clusters uses expected distances.

13. The apparatus of claim 12, wherein the expected distances are computed with the use of first order and second order statistics.

14. The apparatus of claim 10, wherein the aggregate statistics are maintained along with each cluster.

15. The apparatus of claim 14, wherein the aggregate statistics are maintained in terms of first order and second order moments of underlying data values of the data set.

16. The apparatus of claim 14, wherein second order error information is maintained in the aggregate statistics.

17. The apparatus of claim 10, wherein the data set comprises data from a data stream.

* * * * *